US010983613B2

(12) United States Patent
Steinmark et al.

(10) Patent No.: US 10,983,613 B2
(45) Date of Patent: Apr. 20, 2021

(54) STYLUS NIBS WITH A LUBRICATING MATERIAL

(71) Applicant: HEWLETT-PACKARD DEVELOPMENT COMPANY, L.P., Spring, TX (US)

(72) Inventors: Steven Steinmark, Ft. Collins, CO (US); Jonathan D. Bassett, Fort Collins, CO (US); Lauren Domingo, Fort Collins, CO (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/484,156

(22) PCT Filed: Feb. 7, 2017

(86) PCT No.: PCT/US2017/016770
§ 371 (c)(1),
(2) Date: Aug. 7, 2019

(87) PCT Pub. No.: WO2018/147824
PCT Pub. Date: Aug. 16, 2018

(65) Prior Publication Data
US 2020/0026368 A1 Jan. 23, 2020

(51) Int. Cl.
*G06F 3/0354* (2013.01)
(52) U.S. Cl.
CPC ................. *G06F 3/03545* (2013.01)
(58) Field of Classification Search
CPC .................................................. G06F 3/03545
See application file for complete search history.

(56) References Cited

U.S. PATENT DOCUMENTS

| | | | |
|---|---|---|---|
| 6,066,811 A | 5/2000 | Heilman et al. | |
| 2002/0057261 A1 | 5/2002 | An et al. | |
| 2006/0176286 A1 | 8/2006 | Zank et al. | |
| 2009/0262637 A1 | 10/2009 | Badaye et al. | |
| 2011/0037693 A1 | 2/2011 | Chiang | |
| 2012/0327045 A1 | 12/2012 | Skinner | |
| 2013/0234999 A1* | 9/2013 | Kuno | G06F 3/03545 345/179 |
| 2013/0321355 A1* | 12/2013 | Teiblum | G06F 3/044 345/179 |
| 2015/0070304 A1 | 3/2015 | Lettow et al. | |
| 2015/0363012 A1* | 12/2015 | Sundara-Rajan | G06F 3/03545 345/179 |
| 2018/0196533 A1* | 7/2018 | Zeliff | G06F 3/044 |

FOREIGN PATENT DOCUMENTS

CN 101575437 A 11/2009

OTHER PUBLICATIONS

Hongtao W., et al. Study on the Tribological Properties of POM/PTFE Blends, Feb. 1996, < http://en.cnki.com.cn/Article_en/CJFDTOTAL-GFZC602.023.htm >.

* cited by examiner

*Primary Examiner* — Chun-Nan Lin
(74) *Attorney, Agent, or Firm* — Thorpe North & Western LLP

(57) ABSTRACT

The present disclosure is drawn to a stylus nib, which includes a polymeric core structure having a plurality of channels formed within the polymeric core structure along a longitudinal axis thereof. The polymeric core structure can be internally lubricated or impregnated with a lubricating material. The tip portion of the nib can be shaped to interface with a drawing surface.

20 Claims, 3 Drawing Sheets

300 preparing a polymeric core structure having a plurality of channels formed within the polymeric core structure along a longitudinal axis thereof, wherein the polymeric core structure is internally lubricated or impregnated with a lubricating material — 310 shaping a tip portion of the nib to form a shape to interface with a drawing surface — 320

STYLUS NIBS WITH A LUBRICATING MATERIAL

BACKGROUND

A stylus is a pen-shaped instrument that can be used to input commands, data, text or artwork into an electronic device. The versatility of the stylus can be dependent on a variety of factors. For example, the type of nib or writing tip employed by a particular stylus can affect the versatility of the stylus. Additionally, different nibs can be made of various materials and can have various dimensions, which can render a particular nib more or less suitable for particular tasks. In some cases, a stylus body can be used with the nib as a generic body that facilitates grasping of the stylus by a user.

DETAILED DESCRIPTION

Many display styluses fail to provide a writing experience that simulates a pen-and-paper feel when used in connection with an electronic display or electronic drawing surface. Often this can be because there is insufficient friction between the stylus nib and the surface. However, too much friction between the stylus nib and the electronic display or drawing surface can result in an unpleasant user experience with regard to the tactile experience or ability to control the stylus movements with adequate precision, due to a slip-stick phenomenon that is common with many plastic materials. The frictional and material properties may also cause accelerated wear to the display surface or drawing surface or/and nib. Finding a stylus nib with the appropriate frictional properties that will last acceptably long may be desirable.

Furthermore, in some examples where the surface is the electronic display, anti-glare coatings may be used. Providing a positive user experience with these coatings may complicate the design further in that one needs to consider the texture and the durability of the anti-glare surface. In many cases, the anti-glare surface or coating can be damaged or removed from the display when used in connection with a display stylus due to the friction between the electronic display (or other drawing surface) and the nib of the stylus. The stylus nibs described herein can help overcome some of these challenges.

Thus, the present disclosure is drawn to stylus nibs, methods of manufacturing stylus nibs, and electronic display systems. In accordance with certain examples of the present disclosure, a stylus nib can include a polymeric core structure having a plurality of channels formed within the polymeric core structure along a longitudinal axis thereof. The polymeric core structure can be internally lubricated or impregnated with a lubricating material. The tip portion of the stylus nib can also be shaped to interface with a drawing surface, such as a remote drawing surface (drawing pad electronically communicating with a remote display) or an actual screen of an electronic display.

Figure 1A:
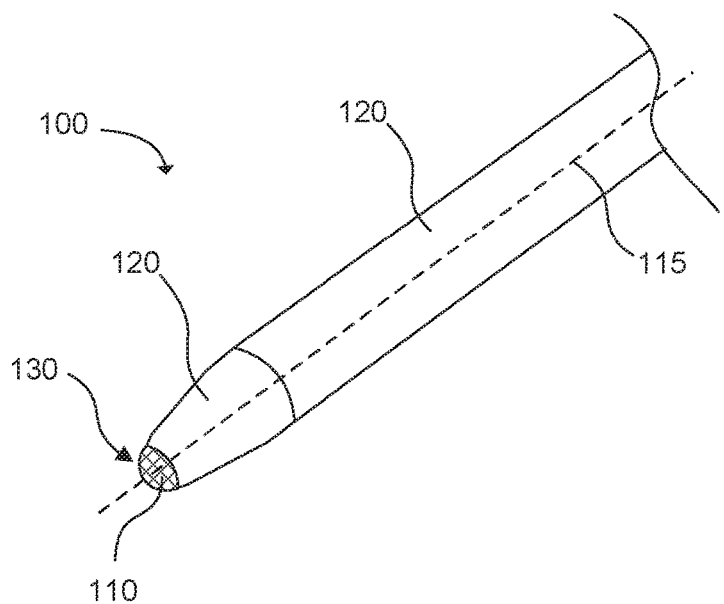
FIG. 1A is a perspective view of an example stylus nib in accordance with the present disclosure.
Figure 1B:
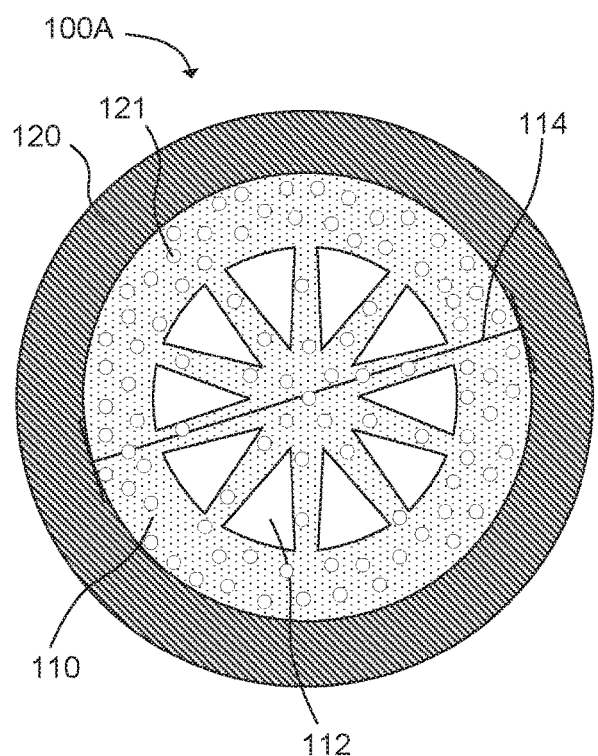
FIG. 1B is a front plan view of an example stylus nib in accordance with the present disclosure.
Figure 1C:
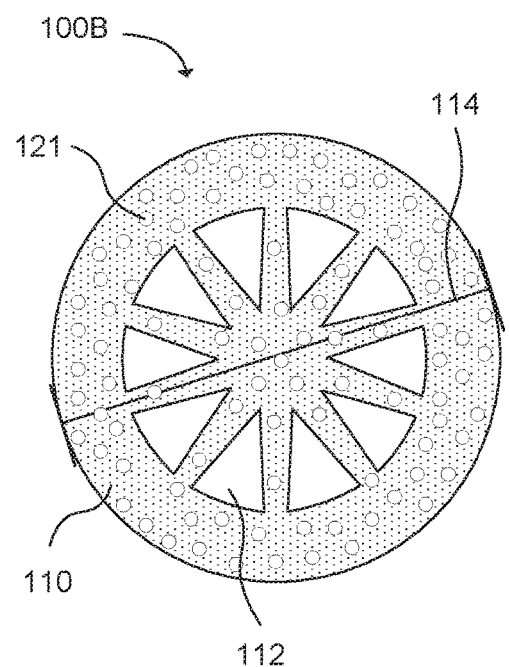
FIG. 1C is a front plan view of an alternative example stylus nib in accordance with the present disclosure.

The stylus nibs described herein are further illustrated in FIGS. 1A-1C, FIG. 1A illustrates a perspective view of an example stylus nib 100. The nib can include a polymeric core structure 110 that is impregnated with a lubricating material. The polymeric core structure can include a plurality of channels (See FIGS. 1B and 1C) formed along a longitudinal axis 115 of the nib. Further, a portion of the nib can be shaped to form a display-engaging tip 130. In the Example shown in FIGS. 1A and 1B, a support jacket 120, usually of a different more rigid material than the nib, can be formed around the nib to provide mechanical support and rigidity.

FIGS. 1B and 1C illustrate a close up front view of the tip portion of a stylus nib 100A and 100B, respectively. The difference between these two examples is that the stylus nib shown at 100A includes a support jacket, and the stylus nib at 100B does not. From this front plan view, a plurality of longitudinal channels 112 is shown within the polymeric core structure 110. The polymeric core can be prepared from any of a number of materials, including polyoxymethylene (POM), nylon, plastic/fiber composite, or a combination thereof.

It is noted that the plurality of longitudinal channels 112 can be formed in a variety of patterns, and the pattern illustrated in FIGS. 1B and 1C is only one example of a pattern that can be used. In some examples, the pattern of channels can be symmetrical. In other examples, the pattern of channels can be asymmetrical. In some specific examples, the plurality of channels can be formed from spaces between adjacent extruded portions of the polymeric core structure 110, or between extruded portions of the polymeric core 110 and the outer jacket 120. As such, the extruded portions can have a cross-sectional pattern that provides spaces between the extruded portions to form the plurality of channels. The term "cross-section" refers to a section that is perpendicular to the longitudinal axis shown in FIG. 1. In one example, the polymeric core material can be prepared using an extrusion die having a predetermined pattern for forming the plurality of channels between adjacent extruded strands of the polymeric core material. In one example, if the support jacket is present (as shown in FIG. 1B), it can likewise be co-extruded around the polymeric core.

Also shown in FIGS. 1B and 1C is a lubricating material 121 that can be applied to or impregnated in the polymeric core structure. In either event, the lubricating material can be internally lubricated within the polymer core structure. The lubricating material can include polytetrafluoroethylene (PTFE), or other chemical lubricants, for example. In one example, these lubricants can be added to the base polymer before the nib is manufactured. In another example, the lubricating material can be impregnated in the polymeric core structure via a co-extrusion process. Thus, the polymeric core material and the lubricating material can be co-extruded together through a common extrusion die. In either case, because the lubricating material is impregnated within the polymer core material, as the nib is used on a drawing surface, the lubricating material can be liberated at the stylus nib tip.

The polymeric core structure can have a tip width or diameter 114 that is the same or different than the width or diameter of the polymeric core throughout the balance of body of the nib. In examples where the stylus nib may not be circular in cross-section, e.g., square, oval, etc., then a distance along the nib's longest width can be used to describe the cross-sectional size of the nib, e.g. a nib with a cross-sectional square shape would be measured from corner to corner to arrive at the width of the nib. In some examples, the tip width of the polymeric core can be the same of as the width of the polymeric core throughout the nib body. In yet other examples, the tip width of the polymeric core can be smaller than the width of the polymeric core throughout the body of the nib. In some specific examples, the tip width (which can be diameter, or longest cross-sectional distance) can be from about 0.2 mm to about 6 mm. In yet other examples, the tip width can be from about 0.3 mm to about 3 mm. In still further examples, the tip width can be from about 0.5 mm to about 2 mm. In many examples, the tip portion of the nib may be semi-spherical in shape. The term "semi-spherical" is intended to cover semi-spherical, semi-elliptical, arcuate, or any other similar three-dimensional curved shapes. Where this is the case, the display-engaging tip can have a spherical tip radius (or radius of curvature, or the like) from about 0.1 mm to about 3 mm, from about 0.2 to about 2 mm, or from about 0.3 to about 1 mm. A "spherical tip radius" can be understood to be the radius of the hypothetical sphere of which the semi-spherical tip forms a semi-spherical cap or spherical segment.

In some examples, the plurality of channels can provide increased friction and/or other desirable tactile properties between the nib and a display surface. For example, the plurality of channels can expose a plurality of edges or flaps at the tip of the polymeric core structure that can engage the electronic display. In some examples, the number and orientation of the channels included in the polymeric core structure can depend on the type of electronic display with which the stylus nib will be used and the degree of friction desired between the nib tip and the electronic display. For example, a higher number of edges or more angled edges at the nib tip may provide additional friction or otherwise different tactile experience compared to a design with fewer and/or more rounded edges. Alternatively, a lower number or larger channels may provide a less rigid feel when bringing the nib into contact with a hard drawing surface such as glass.

Figures 2, 3:
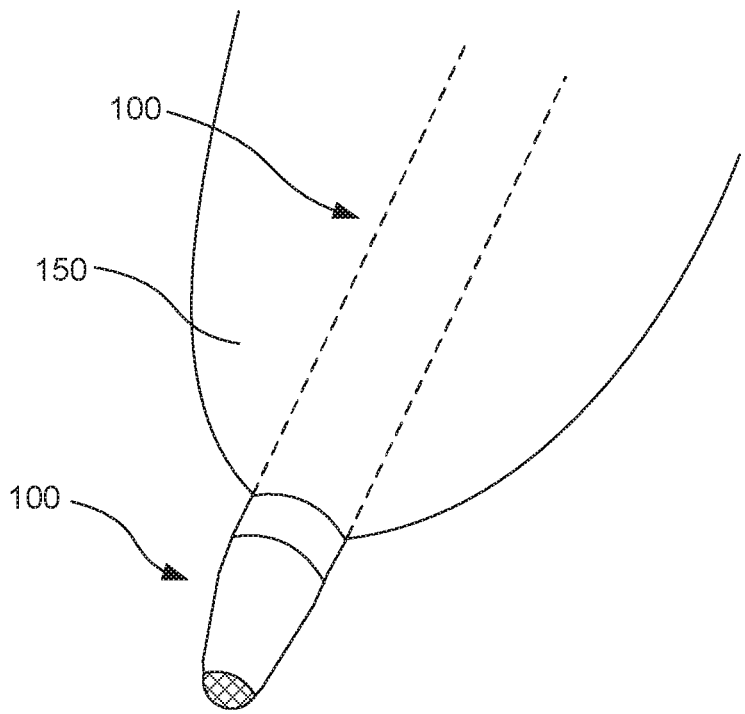
FIG. 2 is a perspective view of an example stylus nib coupled to a stylus body in accordance with the present disclosure.
FIG. 3 is a flowchart illustrating an example method of manufacturing a stylus nib in accordance with the present disclosure.

In some examples, as illustrated in FIG. 2, a display stylus body 150 can be coupled to the stylus nib 100. For example, in some cases, the nib can be removably attachable to the display stylus body. Thus, in some examples, the nib can be a replaceable or exchangeable nib. In yet other examples, the nib can be permanently attached to the stylus body or contiguously formed as part of the stylus body. In further detail, the stylus body can be designed so that it is sensitive to typical human interaction common when using a writing instrument, e.g., sensing position, tilt, roll, hover, and/or communicating wirelessly (or wired) back to a system in the case of a drawing pad coupled to a remote screen.

The stylus body can generally have any suitable geometrical cross-sectional shape (perpendicular to the longitudinal axis). Non-limiting cross-sectional shapes can include circular, elliptical, triangular, square, rectangular, polygonal, the like, or a combination thereof.

A method of manufacturing a stylus nib is also described herein. This is further illustrated in FIG. 3, which depicts a flow chart describing the method 300 of manufacturing the stylus nib. The method can include preparing 310 a polymeric core structure having a plurality of channels formed within the polymeric core structure along a longitudinal axis thereof. The polymeric core structure can be internally lubricated or impregnated with a lubricating material. An additional step can include shaping 320 a tip portion of the nib to form a shape to interface with a drawing surface. In one example, the step of preparing can be by extruding a polymeric core material through an extrusion die having a predetermined pattern for forming the plurality of channels between adjacent extruded strands of the polymeric core material. The polymeric core structure can alternatively be formed via a molding process, an etching process, or the like. In another example, the method can include co-extruding a support jacket over the polymeric core structure. In still another example, the lubricating material can be impregnated in the polymeric core structure via a co-extrusion therewith. A co-extrusion process can include contemporaneously melting and delivering the polymeric core structure and the polymeric lubricating material to a single extrusion die to extrude the materials in a desired form. Alternatively, the lubricating material can be applied to or combined with the polymeric core material prior to preparing the polymeric core structure. In such examples, the lubricating material can be impregnated within the polymeric core structure or portions thereof prior to extrusion.

As previously noted, a portion of the stylus nib can be shaped to form a tip portion that is suitable for engaging with a drawing surface or display surface. The tip shape can be formed by any suitable method. For example, the tip can be cut, shaved, carved, etched, molded, casted, or lathed, etc., to achieve a desired shape or configuration suitable for engaging a drawing surface. Further, in some examples, a stylus body can be formed around the stylus nib for gripping the stylus. The stylus body, for example, can be formed contiguously with the nib. In other examples, the stylus body can be formed separately from the nib and subsequently coupled to the nib.

An electronic display system is also described herein. The electronic display system can include an electronic display; a textured drawing surface that electronically interfaces with the electronic display; and a stylus nib. The stylus nib can include a polymeric core structure having a plurality of channels formed within the polymeric core structure along a longitudinal axis thereof. The polymeric core structure can be internally lubricated or impregnated with a lubricating material. A tip portion of the nib can be shaped to interface with a drawing surface.

Figure 4:
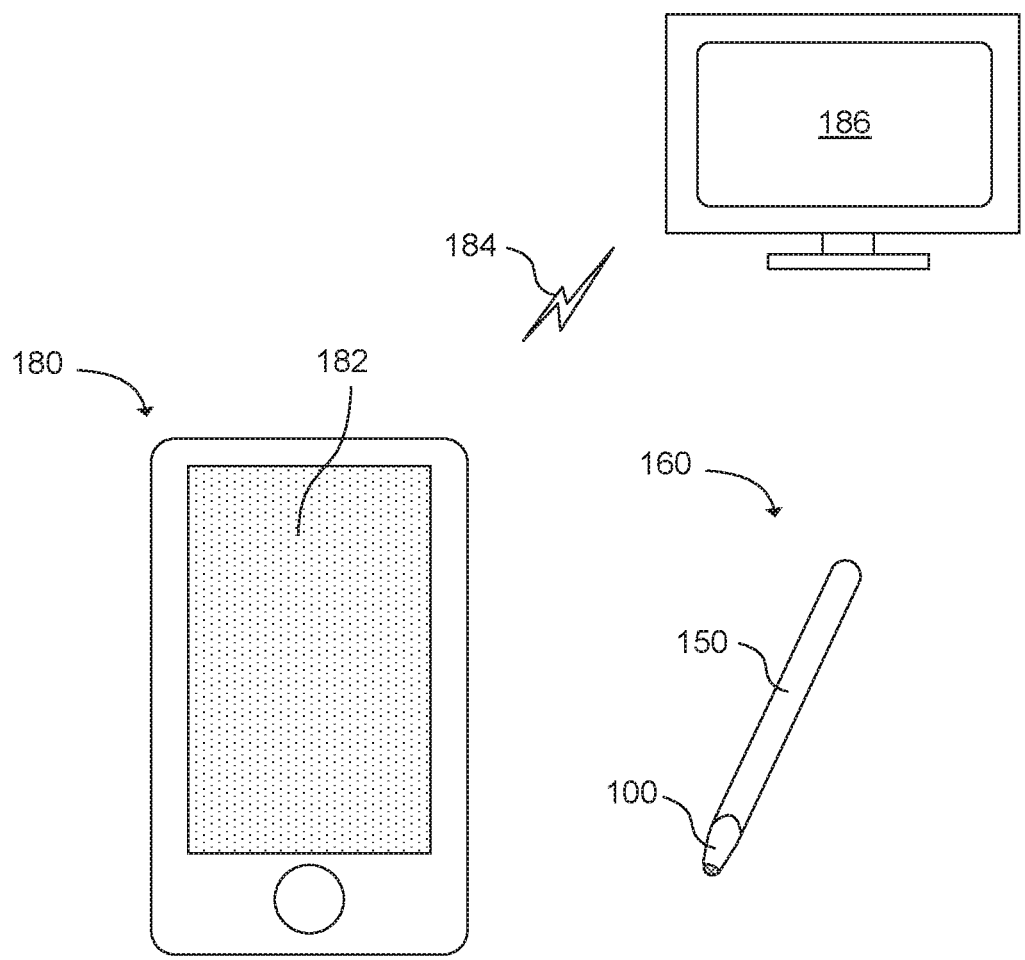
FIG. 4 is a perspective view of an example electronic display system in accordance with the present disclosure.

One example of an electronic display system is illustrated in FIG. 4. The electronic display system can include textured drawing surface 182, which can be an electronic display 180 in one example. The drawing surface of the electronic display system can include an anti-glare coating or surface, or can be otherwise textured. A display stylus 160 can be included with the electronic display and can include a stylus body 150 and a nib 100. In another alternative example, the textured drawing surface 182 might not be an electronic display, but rather the drawing surface can communicate 184 with a remote electronic display 186. Thus, the electronic display may be at the drawing surface itself, or the electronic display may be remote from the drawing surface. A variety of electronic displays can be used. Non-limiting examples can include a tablet, a personal computer, a digital audio player, a smart phone, a printing device, the like, or a combination thereof.

One benefit of the combination of the configuration of the stylus (e.g., at the tip), the internal lubrication, and the textured drawing surface is that it can provide a very similar feeling to that of a pencil or a pen. Often, a stylus can slide too freely across a glass surface without the desired amount of drag. Conversely, with this system, there is a small amount of drag that is felt by the user, similar to that which a user would feel when writing with a pencil or a ball point pen on paper. Even though there is some drag or resistance provided by the textured drawing surface and the polymeric core structure flaps at the tip of the stylus, because of the internal lubrication, this resistance or pencil feel does not unduly wear down the tip.

If the drawing surface is an electronic display, the screen of the electronic display can typically include glass, clear plastic, or other transparent materials. Further, the screen can include an anti-glare surface. In some examples, the anti-glare surface can be achieved via an anti-glare coating applied to the screen of the electronic display. The coating could be a spray coating such as SolGel or vacuum-deposition coating, including material applied by one or more coating steps. In some examples, a UV or thermal curing process may be used to apply the coating. In yet other examples, the anti-glare surface can be achieved by etching the surface of the screen to achieve anti-glare properties. The etching may be a chemical etching, with one or more etching steps to achieve the desired texture and optical properties. Still further, the anti-glare surface can be formed using a film with molded, imprinted, etched, or other applied anti-glare texture. As also mentioned, in some examples the drawing surface is not the electronic display per se, but rather a device to communicate remotely with an electronic display. Those types of surfaces may also be textured and can be used in accordance with examples of the present disclosure. Similar materials to the clear materials described above may be used, but since the drawing surface is not also a screen, there is a larger variety of materials that may be used with varying degrees of opacity. Regardless of which example is described, the texture depth may typically be from about 1 µm to 200 µm, for example.

It is noted that, as used in this disclosure, the singular forms "a," "an," and "the" include plural referents unless the context clearly dictates otherwise.

As used herein, the term "about" is used to provide flexibility to a numerical range endpoint by providing that a given value may be "a little above" or "a little below" the endpoint. The degree of flexibility of this term can be dictated by the particular variable and would be within the knowledge of those skilled in the art to determine based on experience and the associated description herein.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 wt % to about 5 wt %" should be interpreted to include not only the explicitly recited values of about 1 wt % to about 5 wt %, but also include individual values and sub-ranges within the indicated range. Thus, included in this numerical range are individual values such as 2, 3.5, and 4 and sub-ranges such as from 1-3, from 2-4, and from 3-5, etc. This same principle applies to ranges reciting only one numerical value. Furthermore, such an interpretation should apply regardless of the breadth of the range or the characteristics being described.

As a further note, in the present disclosure, it is noted that when discussing the stylus nib, methods of manufacturing stylus nib, and electronic display systems, each of these discussions can be considered applicable to each of these examples, whether or not they are explicitly discussed in the context of that example. Thus, for example, in discussing details about the stylus nib per se, such discussion also refers to the methods and the systems described herein, and vice versa.

EXAMPLES

The following examples illustrate the embodiments of the disclosure that are presently best known. However, it is to be understood that the following are only exemplary or illustrative of the application of the principles of the present technology. Numerous modifications and alternative compositions and methods may be devised by those skilled in the art without departing from the spirit and scope of the present disclosure. The appended claims are intended to cover such modifications and arrangements.

Example 1

Preparation of Stylus Nibs

Multiple stylus nibs were prepared as follows. First, a capillary nib was prepared by extruding polyoxymethylene (POM). Second, a fibrous nib was also obtained, which can also be prepared by extrusion. Third, a stylus nib impregnated with a lubricating material was also prepared by a co-extrusion process. Specifically, a POM material was doped or mixed polytetrafluoroethylene (PTFE) lubricating material to form the raw material for extruding a polymeric core structure of POM impregnated with the lubricating PTFE. The extrusion die included a predetermined pattern to provide the polymeric core structure with a plurality of channels formed along a longitudinal axis thereof.

Example 2

Evaluation of Nibs

The nibs prepared in Example 1 were evaluated by simulating repetitive scribing action of the nib on a display surface, and measuring the wear rate of the nib and visual degradation of the display surface. The capillary nib and the fibrous nib were each able to endure 100,000 cycles of exposure before their useful life was exhausted. In contrast, the stylus nib that was co-extruded to form longitudinal channels defined by a polymeric core structure impregnated with co-extruded lubricating material was able to endure four times the exposure (400,000 cycles) before its useful life was exhausted.

While the present technology has been described with reference to certain examples, those skilled in the art will appreciate that various modifications, changes, omissions, and substitutions can be made without departing from the spirit of the disclosure. It is therefore intended that the disclosure be limited only by the scope of the appended claims.

What is claimed is:

1. A stylus nib, comprising a polymeric core structure having a plurality of channels formed within the polymeric core structure along a longitudinal axis thereof, wherein the polymeric core structure is internally lubricated or impregnated with a lubricating material, and wherein a tip portion of the stylus nib is shaped to interface with a drawing surface, wherein the polymeric lubricating material is liberated from the polymeric core structure when the tip portion interfaces with the drawing surface.

2. The stylus nib of claim 1, wherein the polymeric core structure comprises polyoxymethylene, nylon, plastic/fiber composite, or a combination thereof.

3. The stylus nib of claim 1, wherein the polymeric core structure has a tip width from 0.2 mm to about 6 mm.

4. The stylus nib of claim 1, wherein the plurality of channels is formed from spaces between adjacent extruded portions of the polymeric core structure, wherein the extruded portions have a cross-sectional pattern, relative to the longitudinal axis, that provides the spaces therebetween.

5. The stylus nib of claim 1, wherein the lubricating material comprises polytetrafluoroethylene (PTFE).

6. The stylus nib of claim 1, wherein the tip portion has a generally semi-spherical shape.

7. The stylus nib of claim 1, further comprising a stylus body coupled to the stylus nib.

8. A method of manufacturing a stylus nib, comprising:
preparing a polymeric core structure having a plurality of channels formed within the polymeric core structure along a longitudinal axis thereof, wherein the polymeric core structure is internally lubricated or impregnated with a lubricating material; and
shaping a tip portion of the stylus nib suitable to interface with a drawing surface,
wherein the polymeric lubricating material is liberated from the polymeric core structure when a tip portion of the stylus nib interfaces with the drawing surface.

9. The method of claim 8, wherein the preparing step is by extruding a polymeric core material through an extrusion die having a predetermined pattern for forming the plurality of channels between adjacent extruded strands of the polymeric core material.

10. The method of claim 9, further comprising co-extruding a support jacket over the polymeric core structure.

11. The method of claim 9, wherein the lubricating material is impregnated in the polymeric core structure by pre-mixing or co-extrusion.

12. An electronic display system, comprising:
an electronic display;
a drawing surface that electronically interfaces with the electronic display; and
a stylus nib comprising a polymeric core structure having a plurality of channels formed within the polymeric core structure along a longitudinal axis thereof, wherein the polymeric core structure is internally lubricated or impregnated with a lubricating material, and wherein a tip portion of the stylus nib is shaped to interface with the drawing surface, wherein the polymeric lubricating material is liberated from the polymeric core structure when the tip portion is interfaces with the drawing surface.

13. The electronic display system of claim 12, wherein the drawing surface is a screen surface for the electronic display.

14. The electronic display system of claim 12, wherein the drawing surface remotely electronically interfaces with the electronic display.

15. The electronic display system of claim 12, wherein the drawing surface is a textured drawing surface.

16. The electronic display system of claim 12, wherein the polymeric core structure comprises polyoxymethylene, nylon, plastic/fiber composite, or a combination thereof.

17. The electronic display system of claim 12, wherein the polymeric core structure has a tip width from 0.2 mm to about 6 mm.

18. The electronic display system of claim 12, wherein the plurality of channels is formed from spaces between adjacent extruded portions of the polymeric core structure, wherein the extruded portions have a cross-sectional pattern, relative to the longitudinal axis, that provides the spaces therebetween.

19. The electronic display system of claim 12, wherein the lubricating material comprises polytetrafluoroethylene (PTFE).

20. The electronic display system of claim 12, wherein the tip portion has a generally semi-spherical shape.

* * * * *